United States Patent [19]

Fujimori

[11] Patent Number: 5,375,230
[45] Date of Patent: Dec. 20, 1994

[54] PORTABLE ELECTRONIC DEVICE WITH SELECTABLE RESUME AND SUSPEND OPERATIONS UTILIZING BATTERY POWER CONTROL SCHEME WITH USER AFFIRMATION PROMPT

[75] Inventor: Atsushi Fujimori, Tokyo, Japan

[73] Assignee: Kabushiki Kaisha Toshiba, Kawasaki, Japan

[21] Appl. No.: 104,925

[22] Filed: Aug. 12, 1993

Related U.S. Application Data

[63] Continuation of Ser. No. 624,306, Dec. 7, 1990, abandoned.

[30] Foreign Application Priority Data

Dec. 28, 1989 [JP] Japan ................... 1-344309

[51] Int. Cl.⁵ ............................................ G06F 1/32
[52] U.S. Cl. ............................. 395/575; 364/DIG. 1; 364/DIG. 2; 364/273.1; 364/285.2
[58] Field of Search ... 364/200 MS File, 900 MS File, 364/DIG. 1, DIG. 2; 395/425, 575

[56] References Cited

U.S. PATENT DOCUMENTS

| | | | |
|---|---|---|---|
| 4,165,532 | 8/1979 | Kendall et al. | 364/420 |
| 4,176,395 | 11/1979 | Evelyn-Veere et al. | 364/420 |
| 4,393,500 | 7/1983 | Imazeki et al. | 371/13 |
| 4,412,284 | 10/1983 | Kerforne et al. | 395/575 |
| 4,636,949 | 1/1987 | Longabaugh | 364/400 |
| 4,907,150 | 3/1990 | Arroyo et al. | 395/575 |
| 4,994,934 | 2/1991 | Bouhenguel | 361/71 |
| 5,021,983 | 6/1991 | Nguyen et al. | 364/707 |
| 5,155,842 | 10/1992 | Rubin | 395/575 |

OTHER PUBLICATIONS

EDN Electrical Design News, "Hands-on Investigation Help Exploit CMOS Designs", Cushman, vol. 28, No. 8, Apr. 1983 pp. 123–131.
Hewlett-Packard Journal, "Design of HP's Portable Computer Family", Eaton et al., 37, No. 7, Jul. 1986 pp. 4–13.

Primary Examiner—Joseph L. Dixon
Assistant Examiner—Matthew M. Kim
Attorney, Agent, or Firm—Cushman, Darby & Cushman

[57] ABSTRACT

A portable electronic device comprises a control section comprising CPU and RAM which turn off a power if a keyboard has not been operated for a predetermined period of time, set whether the power is to be turned off, and set the predetermined period of time in which the power is turned off. The RAM saves data which is being processed when the power is turned off, even after the power is turned off. The CPU enables the process which is interrupted when the power is turned off to be resumed, on the basis of the data stored in the RAM and determines whether to resume the process which is interrupted when the power is turned off.

4 Claims, 6 Drawing Sheets

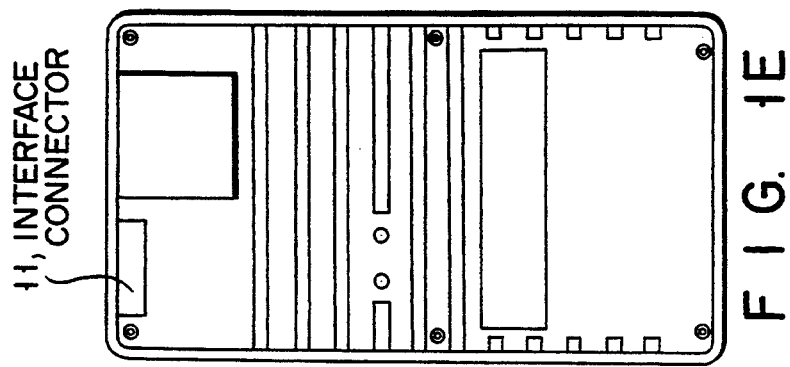
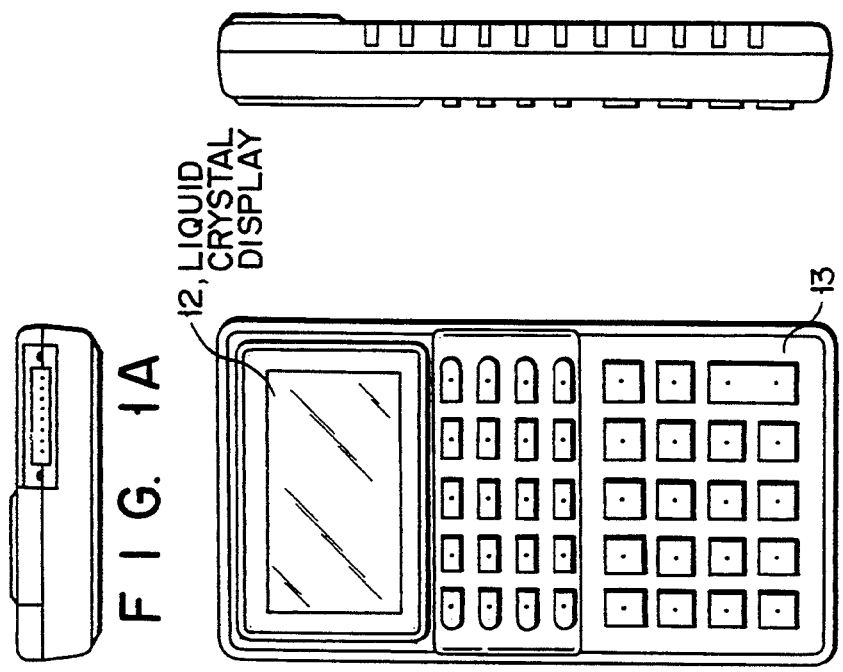
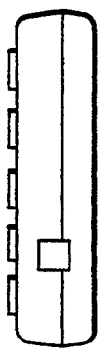
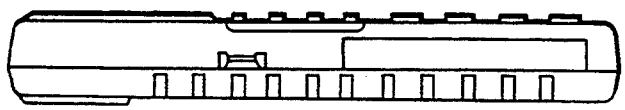

| STATUS | AUTOMATIC POWER-OFF FUNCTION | RUSUME FUNCTION |
|---|---|---|
| (1) | 300 SECONDS (DEFAULT) | OFF (DEFAULT) |
| (2) | 180 SECONDS | OFF (DEFAULT) |
| (3) | 180 SECONDS | ON |
| (4) | 300 SECONDS | ON |
| (5) | OFF | — |
| (6) | OFF | — |
| (7) | 180 SECONDS | OFF |
F I G. 5B
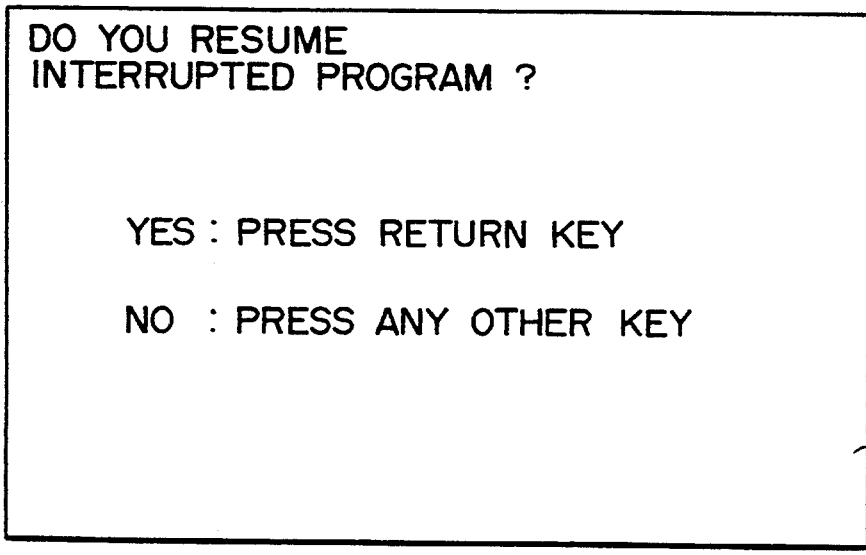
F I G. 6

PORTABLE ELECTRONIC DEVICE WITH SELECTABLE RESUME AND SUSPEND OPERATIONS UTILIZING BATTERY POWER CONTROL SCHEME WITH USER AFFIRMATION PROMPT

This is a continuation of application Ser. No. 07/624,306, filed on Dec. 7, 1990, which was abandoned upon the filing hereof.

BACKGROUND OF THE INVENTION

1. Field of the Invention

This invention relates to a portable electronic device such as a handy terminal, and more particularly to a portable electronic device which has the function of automatically turning off a power source after a lapse of a predetermined time from the last keyboard operation, and which performs a resuming function of maintaining data which was processed in a program memory, and then enabling a user to resume the processing of the data when the power source is turned on by the user.

2. Description of the Related Art

In recent years, portable electronic devices which driven by batteries have been developed, and have been utilized in the fields of distribution, finance, traffic, and the like. The battery used in these devices must be small and light since the devices would otherwise become large and heavy. The smaller the battery, the less the power storage available. To operate the battery-driven devices as long as possible, the devices must have a function for saving power. This is why hand-held calculators, for example, have an automatic power-off function.

Without an automatic power-off function, a device will waste power if the user forgets to turn off the power switch or turns on the power switch unnecessarily. To save power, the user may turn off the power switch upon finishing a data processing. Every time he or she turns off the switch, the data processed is erased and can no longer be processed.

SUMMARY OF THE INVENTION

It is an object of the present invention to provide a compact and light portable electronic device, which can determine whether to perform an automatic power-off function, whether to perform a resume function, or whether to resume an operation when the power source is turned on after the power source has been turned off. This arrangement saves power without erasing necessary data.

Additional objects and advantages of the invention will be set forth in the description which follows, and in part will be obvious from the description, or may be learned by practice of the invention. The objects and advantages of the invention may be realized and obtained by the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1A is a top view showing a portable electronic device according to an embodiment of the present invention;

FIG. 1B is a left-side view of the device;
FIG. 1C is a front view of the device;
FIG. 1D is a right-side view of the device;
FIG. 1E is a back view of the device;
FIG. 1F is a bottom view of the device;
FIGS. 5A and 5B are views showing some examples of coding for setting the automatic power-off and resume function modes of the device shown in FIG. 1;
and
FIG. 6 is a view showing the message displayed when the resume function is selected.

DETAILED DESCRIPTION OF THE PREFERRED EMBODIMENTS

Figure 2:
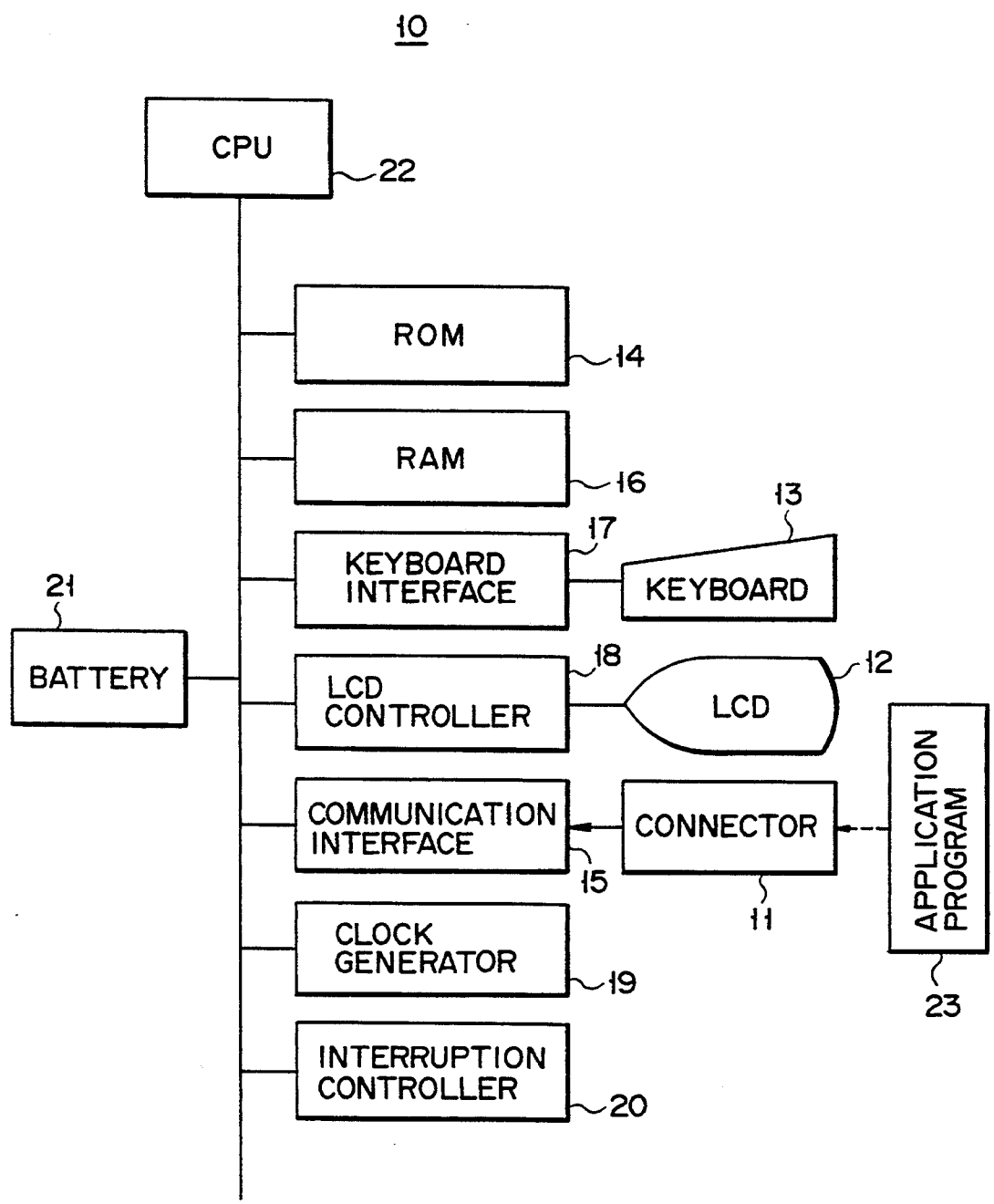
FIG. 2 is a block diagram showing the control section of the device shown in FIG. 1.

FIGS. 1A to 1F show in different directions a portable electronic device according to an embodiment of the invention. On its back side, the device has interface connector 11 for down-loading of an application program from an external device and for achieving data communication with an external device so that an application program can be replaced with another. On its front side, the device also has a liquid crystal display (LCD) 12 and keyboard input section 13 which allow the device to operate without an external device. Keyboard input section 13 includes a power key, operation keys, and the like. The device contains control section 10, shown in FIG. 2, for controlling operations of the device.

Control section 10 comprises central processing unit (CPU) 22, read only memory (ROM) 14, keyboard interface 17, LCD controller 18, communication interface 15, clock generator 19, and interruption controller 20, all of which are connected to one another via a bus line. The bus line is connected to power source or battery 21 by a switch, which is opened or closed by the power key. ROM 14 stores an operating system for controlling the entire control section. Application program 23 developed in an external personal computer or the like is down loaded to random access memory (RAM) 16 via connector 11 and communication interface 15. RAM 16 is either of a battery back-up type or a nonvolatile type, so that data stored in RAM 16 is not erased even after power source 21 has been turned off. Keyboard 13 is connected to keyboard controller 17. LCD 12 is connected to LCD controller 18. Clock generator 19 decrements the count of the counter incorporated in CPU 22. Accordingly, CPU 22 causes the power source to be automatically turned off upon lapse of a predetermined period of time.

The operation of the above-described device will now be described with reference to FIGS. 3 and 4. It should be assumed that an external application program downloaded into the device includes a system determining whether the power source is automatically turn off, how long the limit period is in which the power source can be kept on after the last keyboard operation, and whether the resuming function is selected.

Figure 3:
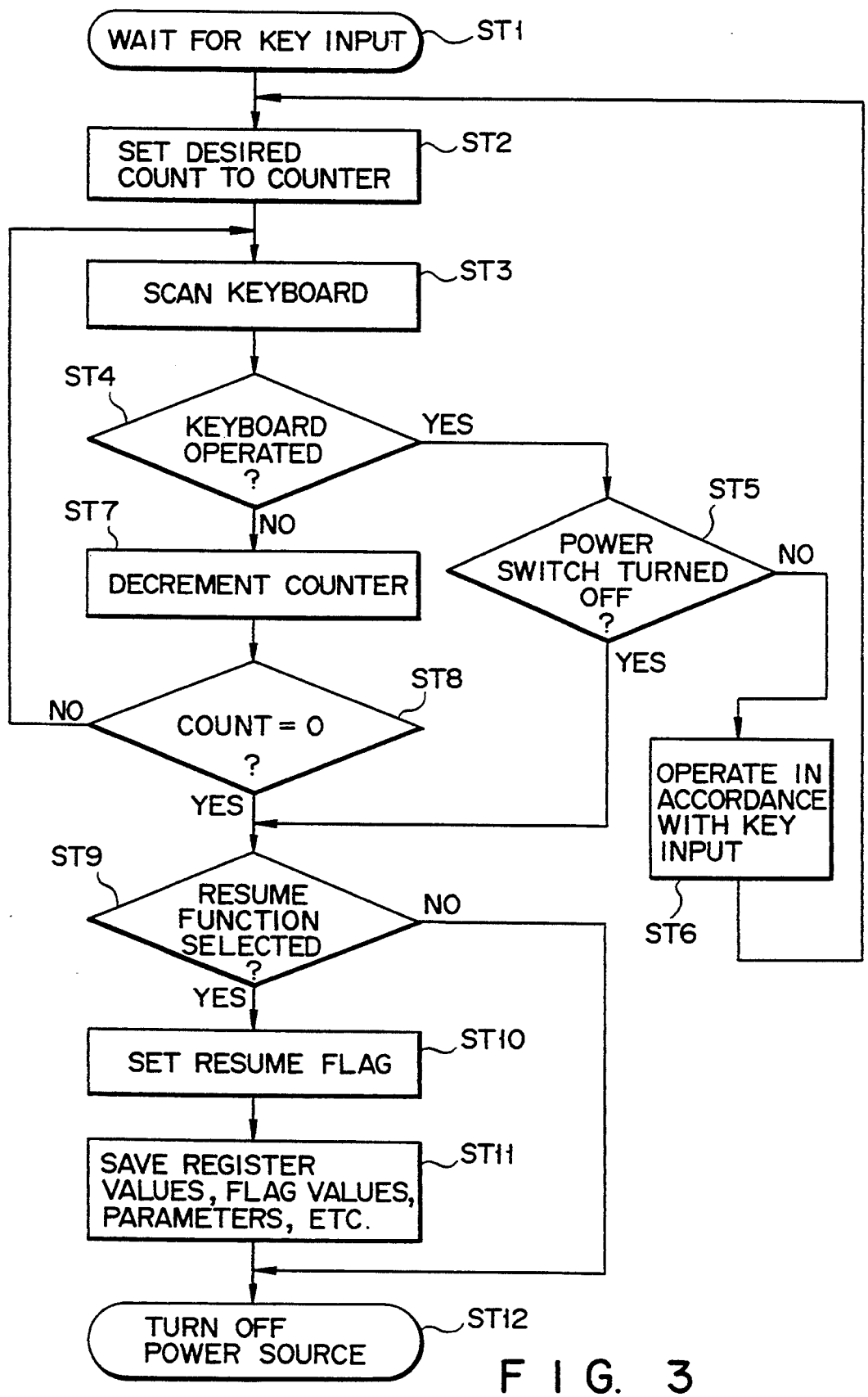
FIG. 3 is a flowchart explaining operations of the device shown in FIG. 1 to turn off the power source.
Figure 4:
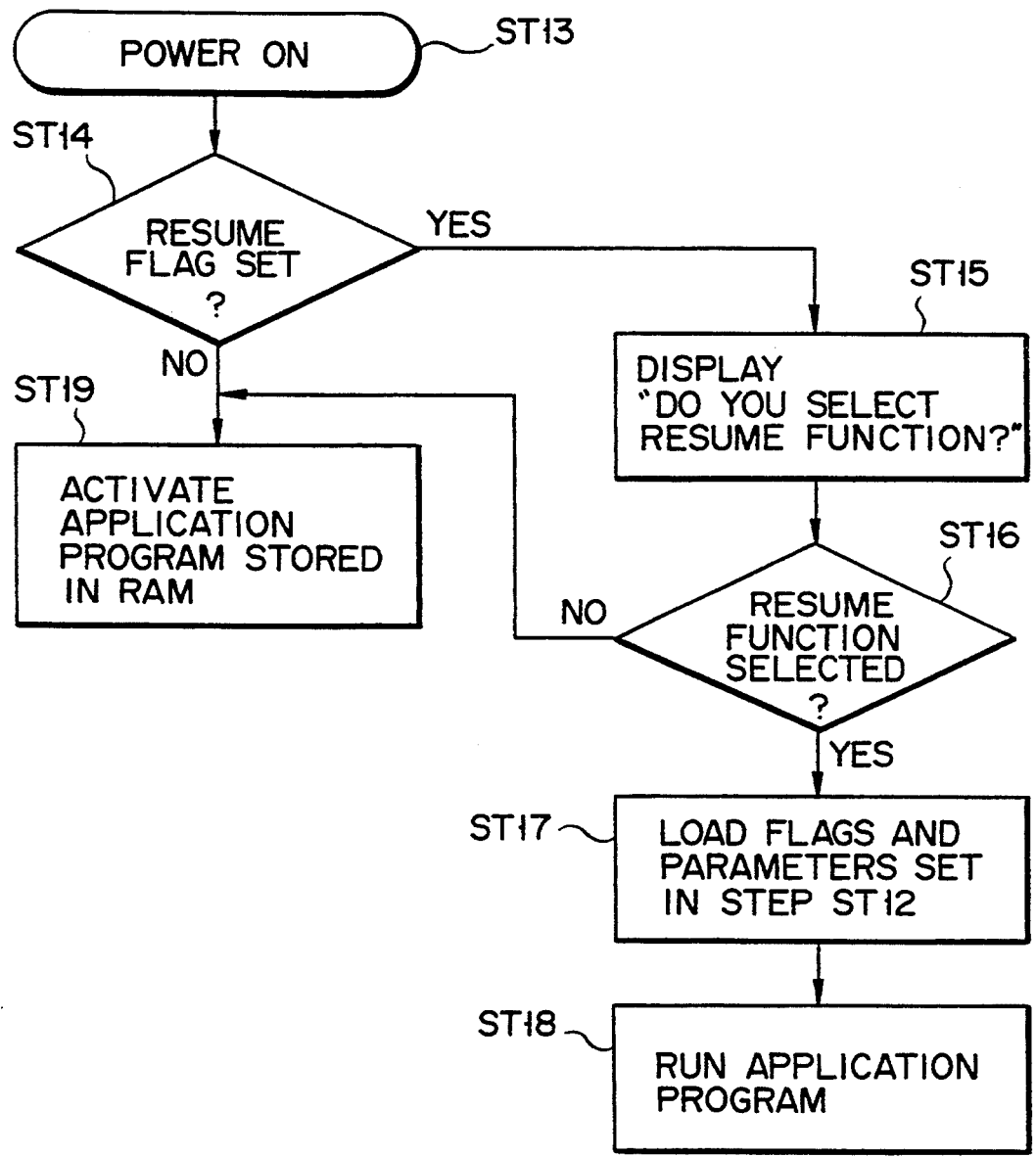
FIG. 4 is a flowchart explaining operations of the device shown in FIG. 1 to turn on the power source.

Flowchart of FIG. 3 represents steps for turning off the power source. In a state of waiting for key input (ST1), the counter is set to a value corresponding to the limit period set in the application program for automatically turning off the power source (ST2). Then, keyboard scanning is performed by ordinary key operations (ST3). During the key operations, CPU 22 determines whether operations are continuously performed (ST4). For YES in step ST4, processes are executed based on the key input data (ST6) unless the power key is turned off or an OFF key is depressed (ST5). When the key input is determined to stop in step ST5, the counter decrement starts (ST7). The CPU then determines whether the counter value has decreased to 0 (ST8). If the counter value is 0, indicating that the limit period has elapsed, CPU determines that the resume function is selected (ST9). If the key operation is restarted before the counter value reaches 0, the flow returns to the step ST3.

If it is determined that the resume function is to be effected, a resume flag is set (ST10), and all of the register values, flag values, and parameters are saved (ST11). Thereafter, the power is turned off (ST12). If it is determined that the resume function is not selected in step ST9, the power is turned off, without executing steps ST10 and ST11. If the OFF key is depressed in step ST5, the flow advances directly to step ST9 in which the resume function is determined to be effected.

The operation will now be described, with reference to FIG. 4, on how the device operates when the power key is depressed after the automatic power-off.

When the power source is turned on by operating the power key (ST13), it is determined whether the resume function is effective (ST14). If YES, LCD 12 displays a message for determining whether a resume operation is to be performed (ST15). If the operator uses the keyboard to give an instruction for performing a resume operation (i.e., the depressing return key), the flags and parameters saved when the power was turned off are loaded (ST17) and the application program is run (ST18). Thus, the operation which has been interrupted when the power source was turned off can be resumed. On the other hand, if the resume function is determined to be ineffective in step ST14, or if the keyboard is operated to give an instruction for not performing a resume operation (i.e., a key other than the return key is depressed) in step ST16, the application program in RAM 16 is activated (ST19).

Figure 5A:
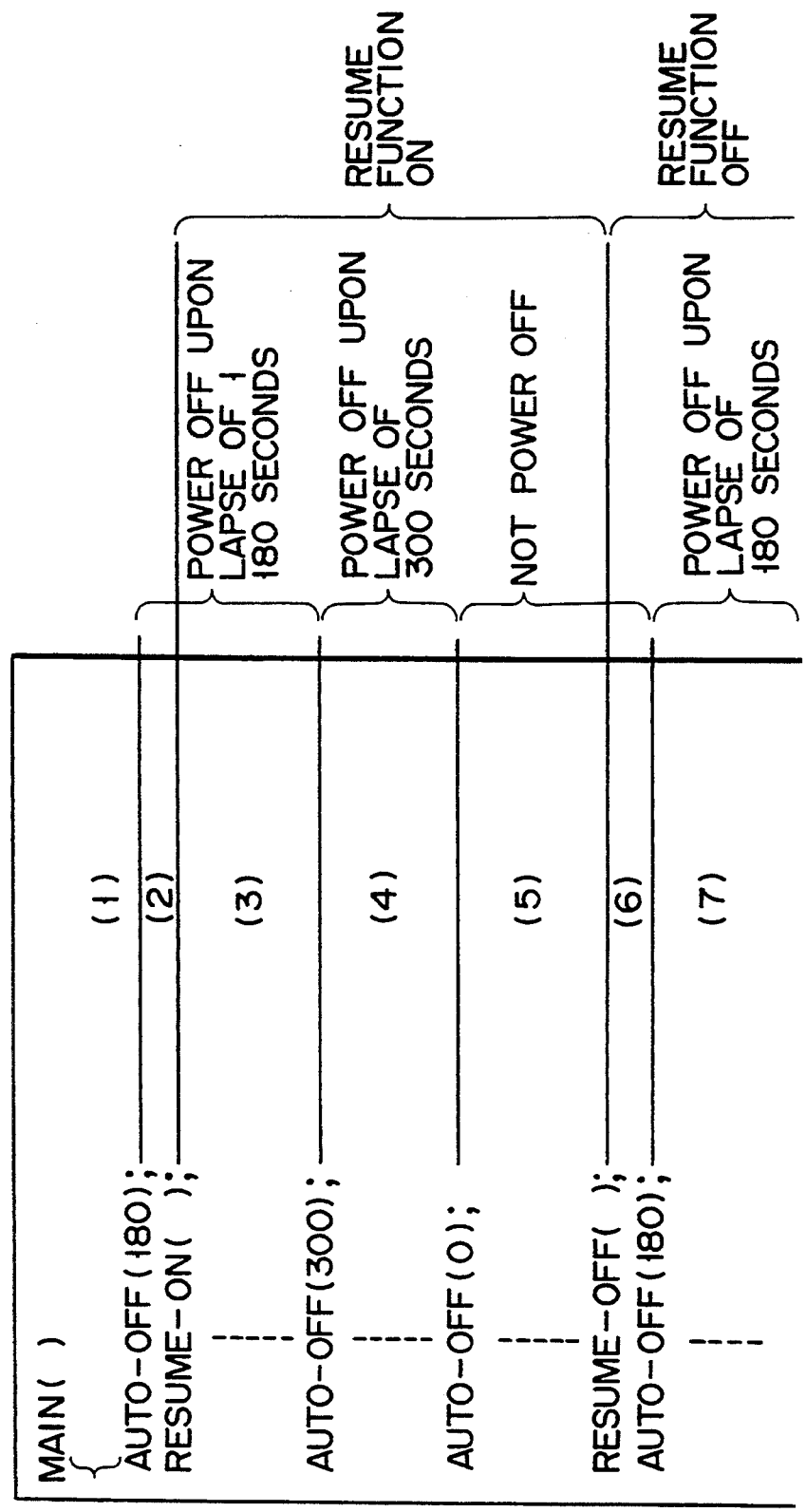

The application program including the coding as shown in FIG. 5A will be described below.

A command "auto-off (i)" sets a limit period for the automatic power-off function. With this command, an instruction to turn off the power source in i seconds is sent to RAM 16. When i=0, the command instructs that the power source 21 should not be turned off. Commands "resume-on( )" and "resume-off( )" are for validating and not invalidating the resume function, respectively. The coding as shown in FIG. 5A achieves the functions as shown in FIG. 5B. In the states (3) and (4) shown in FIG. 5A, i.e., when both the automatic power-off function and the resume functions are effective, power source 21 is turned off after no operation is performed within a set period. At this time, the statuses of all flags and the values in all resistors are stored in RAM 16. The power-off indicates a state in which at least the display of LCD 12 is turned off and no keys of keyboard input section 13 except the power key have been operated. It would be well understood that the operations shown in FIGS. 3 and 4 are performed by CPU 22 in association with the other components.

When power source 21 is turned on by operating the power key, LCD 12 represents instructions to depress the return key if the interrupted program is to be resumed, and to depress any other key if the program is not to be resumed, as shown in FIG. 6. If the return key is depressed, the application program is resumed. If any other key is depressed, the interrupted program is not resumed and the flags and resistors are reset and the application program is activated.

As described above, the application program contains an operating system to determine whether the automatic power-off function is set, how long the limit time is, and whether the resume function is set. The application program can also contain an operating system to select whether a resume operation is performed when the power is turned on after the automatic power-off.

The above control is executed by the operating system on ROM 14. The above-mentioned application program can either be supplied from an external device such as a main computer, or by a memory medium removably connected to the present device.

As has been described above, the present invention can provide a compact and light portable electronic device, which can determine whether an automatic power-off function is to be effected or not, and in which the limit period of time for turning off the power can be set to a desired value, and power can be saved without erasing necessary data.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A portable electronic device having a resuming function, said portable electronic device comprising:

means for manually inputting data to the portable electronic device;

means for processing the data input in accordance with a program;

means for displaying the data processed by said processing means;

a battery for supplying power to said inputting means, processing means and displaying means;

a switch for manually selectively supplying or not supplying power from said battery to said inputting means, processing means and displaying means;

first means for determining that power should not be supplied from said battery to said inputting means and displaying means, based on a process state of the program, when said inputting means is not operated for a predetermined period of time;

second means for determining whether a resuming function has been selected in which the processing state of the program is resumed after power is applied again from said battery;

third means for not supplying power from said battery to said inputting means and said displaying means, based on a determination of said first means;

a memory for storing a process state of said processing means, based on a determination of said second means, when the suspension of power supplied from said battery to said inputting means and displaying means is selected by one of said switch and first means;

means for displaying a question as to whether an operator desires to resume the process state stored in said memory on said displaying means when the supply of the power is selected by said switch;

means for accepting a response to said question made by said operator on said inputting means; and means for resuming execution of the program from the state which existed before the supply of the power was suspended, based on the process state stored in said memory when said operator answers said question affirmatively.

2. The portable electronic device according to claim 1, wherein said first means includes:

memory means for storing first identifying information which indicates one of suspension and continuation of supply of the power from said battery to said inputting means and displaying means, when said inputting means is not operated for a predetermined period of time, and second identifying information for indicating the predetermined period of time; and means for determining one of suspension and continuation of the supply of the power from said battery to said inputting means and displaying means, based on the first identifying information when said inputting means is not operated for the predetermined period of time indicated by the second identifying information stored in said memory means.

3. The portable electronic device according to claim 1, wherein said second means includes:

memory means for storing identifying information for identifying whether each process state of the program is to be resumed; and means for determining whether the process state of the program is to be resumed based on the identifying information stored in said memory means.

4. The portable electronic device according to claim 1, further comprising means for executing the program, without resuming a state which existed before the supply of power was suspended, when the operator does not select resumption of the process state.

* * * * *